US012460983B2

(12) United States Patent
Tzeng et al.

(10) Patent No.: US 12,460,983 B2
(45) Date of Patent: Nov. 4, 2025

(54) METHOD FOR DETERMINING STEAM LEAKAGE

(71) Applicant: Taiwan Power Company, Taipei (TW)

(72) Inventors: Chian-Wei Tzeng, Taipei (TW);
Xue-Wen Yang, Taipei (TW);
Kwei-Yuan Su, Taipei (TW);
Chuan-Sheng Kao, Taipei (TW);
Sheng-Kai Chan, Taipei (TW)

(73) Assignee: TAIWAN POWER COMPANY, Taipei (TW)

( * ) Notice: Subject to any disclaimer, the term of this patent is extended or adjusted under 35 U.S.C. 154(b) by 245 days.

(21) Appl. No.: 18/072,645

(22) Filed: Nov. 30, 2022

(65) Prior Publication Data
US 2023/0168141 A1    Jun. 1, 2023

(30) Foreign Application Priority Data
Dec. 1, 2021    (TW) .................. 110144850

(51) Int. Cl.
*G01L 23/26*    (2006.01)
*G05B 13/04*    (2006.01)
*G06F 30/20*    (2020.01)
*G06F 119/08*    (2020.01)

(52) U.S. Cl.
CPC .............. *G01L 23/26* (2013.01); *G05B 13/04* (2013.01); *G06F 30/20* (2020.01); *G06F 2119/08* (2020.01)

(58) Field of Classification Search
CPC .... G01N 3/18; G01N 3/12; G01N 2203/0071; G01M 3/04; F22B 37/38; F22B 37/421
See application file for complete search history.

(56) References Cited

U.S. PATENT DOCUMENTS

| | | | | | |
|---|---|---|---|---|---|
| 3,916,673 | A | * | 11/1975 | Gass | G01M 5/0058 73/49.5 |
| 4,385,643 | A | * | 5/1983 | Noe | G01M 3/022 220/236 |
| 4,419,892 | A | * | 12/1983 | Goolsby | G01M 3/005 422/53 |
| 4,548,069 | A | * | 10/1985 | Nousak | G01M 3/2853 73/49.1 |
| 4,560,873 | A | * | 12/1985 | McGowan | G01N 21/3504 250/351 |
| 4,640,233 | A | * | 2/1987 | Draper | F22B 37/56 122/406.1 |
| 4,772,849 | A | * | 9/1988 | Tedder | G01N 27/902 73/623 |
| 5,050,108 | A | * | 9/1991 | Clark | F22B 35/18 73/622 |
| 5,209,568 | A | * | 5/1993 | Buffard | G01N 3/18 374/45 |
| 5,220,824 | A | * | 6/1993 | Shelleman | G01N 3/12 374/57 |
| 5,361,284 | A | * | 11/1994 | Baum | G01N 17/00 73/865.6 |

(Continued)

*Primary Examiner* — Tran M. Tran
(74) *Attorney, Agent, or Firm* — Resonance IP Law, PC

(57) ABSTRACT

A method for measuring steam pressure is provided, in which a steam pressure graph plotted according to temperature and strain is provided, so that the user can look up the steam pressure graph to know the steam pressure value inside a target object and determine whether there is a steam leakage in the target object.

8 Claims, 6 Drawing Sheets

(56) References Cited

U.S. PATENT DOCUMENTS

| | | | | |
|---|---|---|---|---|
| 6,138,514 | A * | 10/2000 | Iwamoto | G01N 29/043 73/598 |
| 6,332,112 | B1 * | 12/2001 | Shukunami | F16T 1/48 702/56 |
| 6,523,999 | B1 * | 2/2003 | Ishii | G01N 3/60 73/766 |
| 6,644,131 | B2 * | 11/2003 | Rebik | F16K 37/005 137/185 |
| 6,997,044 | B1 * | 2/2006 | Maciejewski | G01M 3/2846 73/49.8 |
| 7,552,642 | B2 * | 6/2009 | Neagle | G01N 3/12 73/708 |
| 8,105,533 | B2 * | 1/2012 | Hisamatsu | G01N 3/567 422/53 |
| 8,474,324 | B2 * | 7/2013 | Rihan | G01N 17/006 73/799 |
| 8,590,384 | B2 * | 11/2013 | Lotscher | G01H 11/08 73/649 |
| 8,703,060 | B2 * | 4/2014 | Hsu | G01N 33/22 422/78 |
| 9,291,537 | B2 * | 3/2016 | Ren | G01N 3/08 |
| 9,880,087 | B2 * | 1/2018 | Nishida | G01N 3/12 |
| 10,724,858 | B2 * | 7/2020 | Carlier | G01B 17/025 |
| 10,768,081 | B2 * | 9/2020 | Qi | G01N 3/08 |
| 10,895,519 | B2 * | 1/2021 | Ren | G01N 3/18 |
| 11,155,850 | B2 * | 10/2021 | Heijstra | C12Q 1/02 |
| 11,215,574 | B2 * | 1/2022 | Gyde Thomsen | G01J 5/026 |
| 11,293,912 | B2 * | 4/2022 | Yano | G01N 31/12 |
| 11,294,366 | B2 * | 4/2022 | Nakanishi | G05B 23/024 |
| 11,320,353 | B2 * | 5/2022 | Xuan | G01N 3/18 |
| 11,480,332 | B2 * | 10/2022 | Ferry | F22B 37/38 |
| 11,714,036 | B2 * | 8/2023 | Suh | G01N 3/10 73/826 |
| 2014/0316737 | A1 * | 10/2014 | Wang | F22B 37/38 702/130 |
| 2020/0348018 | A1 * | 11/2020 | Forsberg | F22B 33/04 |
| 2021/0247337 | A1 * | 8/2021 | Yao | G01N 33/20 |

* cited by examiner

METHOD FOR DETERMINING STEAM LEAKAGE

BACKGROUND

1. Technical Field

The present disclosure relates to a method for measuring steam pressure, and more particularly, to a method for predicting whether a steam leakage occurs in metal objects under high temperature and high pressure environments.

2. Description of Related Art

Nowadays, the furnace temperature is as high as 1100° C. when the power generation boiler of the power plant is running, and the general measuring device cannot withstand an environment with such high temperature.

The current prediction method for measuring the creep damage of pipelines and channels in power plants is to install measuring devices in the header section outside the furnace.

However, this kind of measurement method often makes it difficult for maintenance personnel to immediately observe the status of the power generator set, so that the maintenance personnel cannot carry out effective and appropriate treatment.

Therefore, there is a need for a solution that addresses the aforementioned shortcomings in the prior art.

SUMMARY

In view of the aforementioned shortcomings of the prior art, the present disclosure provides a method for measuring steam pressure, the method comprises: providing a steam pressure graph plotted according to temperature and strain; and looking up the steam pressure graph to know a steam pressure value inside a target object to determine whether a steam leakage occurs in the target object.

In the aforementioned method, the steam pressure graph is curvilinearly integrated into a target curve diagram. For example, the target curve diagram is derived from a simulated operation using a dummy furnace tube.

Further, the dummy furnace tube comprises a furnace tube body, a first cylindrical cover and a second cylindrical cover covering both ends of the furnace tube body, a connecting tube penetrating through the first cylindrical cover to protrude at the end of the furnace tube body, and an inner body located in the furnace tube body. For example, the first cylindrical cover and the second cylindrical cover are metal structures. Alternatively, the inner body is a metal tube body and is separated from an inner wall of the furnace tube body with a distance. Or, the connecting tube is a stainless-steel high-pressure tube.

Furthermore, the dummy furnace tube is provided with a thermocouple and a strain gauge to record a strain corresponding to a temperature change of the furnace tube body under conditions of different steam pressures.

Also, the two ends of the dummy furnace tube are closed in the simulated operation, so that a pressure inside the dummy furnace tube is pressurized to an estimated steam pressure and the steam pressure is kept constant, and an outer wall of the dummy furnace tube is heated to simulate an operation of the target object.

In addition, a target formula is obtained based on the target curve diagram via curve fitting. For example, the target formula is an exponential mathematical representation of a deformation of metal materials due to different steam pressures with operating temperature.

As can be understood from the above, in the method for measuring steam pressure of the present disclosure, the steam pressure graph is provided, so that the user can determine whether a steam leakage occurs in the target object by looking up the graph. Therefore, the method of the present disclosure can predict whether the furnace tube is damaged without entering the high temperature environment to observe the measuring device at the power generation boiler of power plant site, so that the maintenance personnel (or other users) can easily and immediately know the status of the power generator set, so as to carry out effective and appropriate treatment.

DETAILED DESCRIPTION

Figure 1:
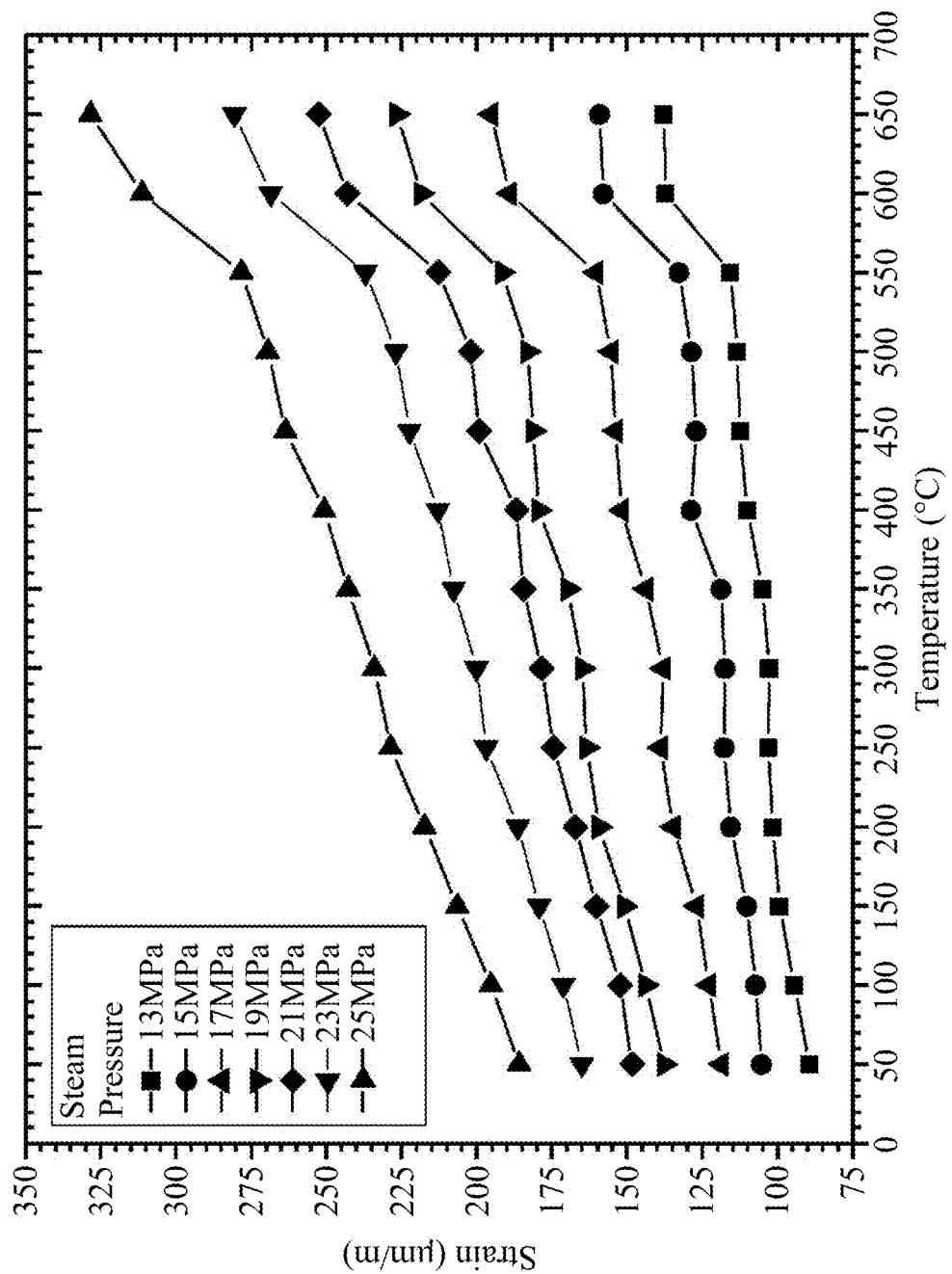
FIG. 1 is a target curve diagram of a furnace tube steam pressure graph used in a method for measuring steam pressure of the present disclosure.

Implementations of the present disclosure are described below by embodiments. Other advantages and technical effects of the present disclosure can be readily understood by one of ordinary skill in the art upon reading the disclosure of this specification.

It should be noted that the structures, ratios, sizes shown in the drawings appended to this specification are provided in conjunction with the disclosure of this specification in order to facilitate understanding by those skilled in the art. They are not meant, in any ways, to limit the implementations of the present disclosure, and therefore have no substantial technical meaning. Without influencing the effects created and objectives achieved by the present disclosure, any modifications, changes or adjustments to the structures, ratios or sizes are construed as falling within the scope covered by the technical contents disclosed herein. Meanwhile, terms such as "on," "above," "first," "second," "one," "a," "an," and the like, are for illustrative purposes, and are not meant to limit the scope implementable by the present disclosure. Any changes or adjustments made to the relative relationships, without substantially modifying the technical contents, are also to be construed as within the scope implementable by the present disclosure.

The method for measuring steam pressure of the present disclosure uses temperature and strain to plot a furnace tube steam pressure graph (e.g., the target curve diagram as shown in FIG. 1) for maintenance personnel to look up the graph to know the steam pressure value inside a furnace tube of the furnace (such as a heat-exchange tube) so as to determine whether the target object (such as an actual furnace tube) has any steam leakage accidents caused by conditions such as abnormal expansion or broken tube.

Figure 2:
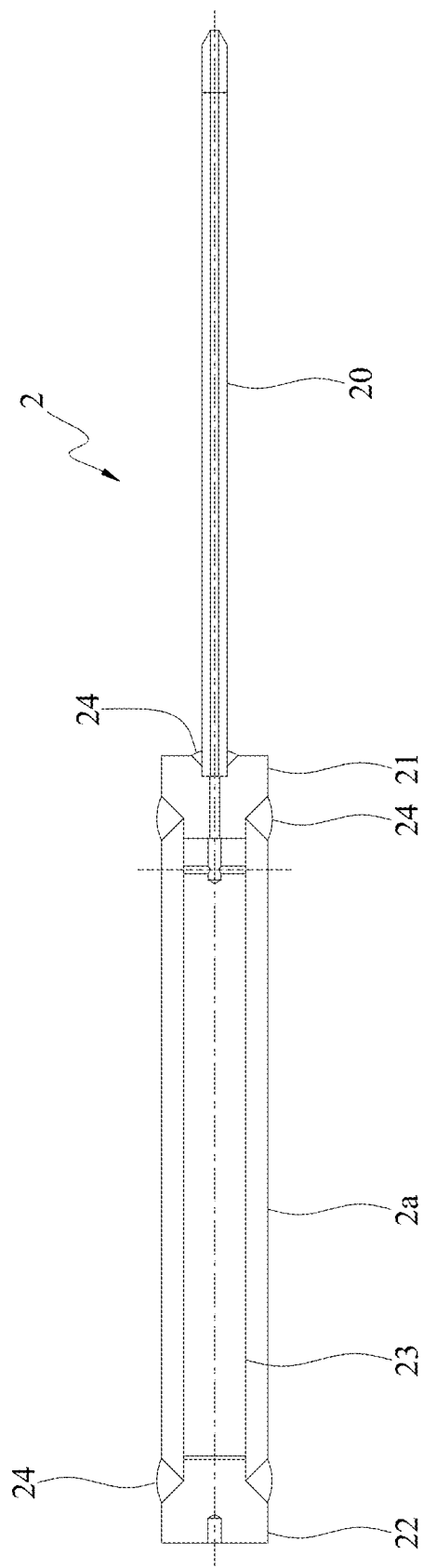
FIG. 2 is a schematic plan view of a dummy furnace tube used in a simulated operation of FIG. 1.

In an embodiment, the target curve diagram is obtained by implementing a simulated operation with using a dummy furnace tube 2 (as shown in FIG. 2).

The dummy furnace tube 2 comprises a furnace tube body 2a, a first cylindrical cover 21 and a second cylindrical cover 22 covering both ends of the furnace tube body 2a, a connecting tube 20 penetrating through the first cylindrical cover 21 to protrude at the end of the furnace tube body 2a, an inner body 23 located in the furnace tube body 2a, and a weld bead 24 surrounding the circumference of the furnace tube body 2a.

The furnace tube body 2a is a sample of an entire furnace tube, and a sampling length of the furnace tube body 2a is greater than 150 mm+2D. After mechanically cutting the sample of the entire furnace tube, a surface of the sample is performed with a non-destructive testing, and a subsequent processing operation can be carried out once the standard is met, where D is an outer diameter of the entire furnace tube.

The first cylindrical cover 21 and the second cylindrical cover 22 are convex structures made of stainless-steel material.

The inner body 23 is a stainless-steel tube body, and the distance between the inner body 23 and an inner wall of the furnace tube body 2a is 0.5 mm.

The connecting tube 20 is a high-pressure tube made of stainless-steel material and is used as a pressure injection tube.

The bevel processing of the dummy furnace tube 2 is carried out in accordance with the welding specification of ASME (American Society of Mechanical Engineers) B31.1, and a welding procedure between the furnace tube body 2a and the first cylindrical cover 21, the second cylindrical cover 22, the connecting tube 20 is completed by argon tungsten arc welding. And after the welding is completed, the weld bead 24 should pass the radiographic inspection, and a water pressure test with 1.2 times pressure is performed before the simulated operation to ensure that there is no pressure drop within 10 minutes.

In an embodiment, the working environment temperature of the simulated operation is maintained at 10° C. to 30° C.

Further, the inner diameter, the outer diameter and the axial dimension of the dummy furnace tube 2 should be recorded before processing, such as an outer diameter of 46.52 mm, a tube wall thickness of 5.62 mm, etc.

Also, at least one thermocouple and strain sensor are installed in an upper section, a middle section and a lower section of the dummy furnace tube 2.

In addition, the dummy furnace tube 2 is pressurized for 10 minutes, and then is heated and the relevant data is recorded.

In the simulated operation, the dummy furnace tube 2 may be regarded as an actual furnace tube, and the two ends of the dummy furnace tube 2 are closed, so that a pressure inside the dummy furnace tube 2 is pressurized to an estimated/expected steam pressure, and the steam pressure is kept constant. The outer wall of the dummy furnace tube 2 is heated to simulate an operation of the actual furnace tube (the simulated operating temperature is from room temperature to 850 degrees Celsius), wherein the simulated operation simulates the operation status of the furnace tube of the boiler of the actual power plant, and thermocouples and strain gauges are installed on the furnace tube body 2a, so that a strain corresponding to a temperature change of the furnace tube body 2a can be recorded under the conditions of different steam pressures, as shown in Table 1, wherein each point of the temperature (horizontal axis) in FIG. 1 generates seven strain records.

TABLE 1

| | Number | | | | | | |
|---|---|---|---|---|---|---|---|
| | 5 | 6 | 7 | 8 | 9 | 10 | 11 |
| Steam Pressure (MPa) | 13 | 15 | 17 | 19 | 21 | 23 | 25 |
| Temperature (° C.) | RT | RT | RT | RT | RT | RT | RT |
| | 50 | 50 | 50 | 50 | 50 | 50 | 50 |
| | 100 | 100 | 100 | 100 | 100 | 100 | 100 |
| | 150 | 150 | 150 | 150 | 150 | 150 | 150 |
| | 200 | 200 | 200 | 200 | 200 | 200 | 200 |
| | 250 | 250 | 250 | 250 | 250 | 250 | 250 |
| | 300 | 300 | 300 | 300 | 300 | 300 | 300 |
| | 350 | 350 | 350 | 350 | 350 | 350 | 350 |
| | 400 | 400 | 400 | 400 | 400 | 400 | 400 |
| | 450 | 450 | 450 | 450 | 450 | 450 | 450 |
| | 500 | 500 | 500 | 500 | 500 | 500 | 500 |
| | 550 | 550 | 550 | 550 | 550 | 550 | 550 |
| | 600 | 600 | 600 | 600 | 600 | 600 | 600 |
| | 650 | 650 | 650 | 650 | 650 | 650 | 650 |

In an embodiment, a pressurizing method uses a circuit of the pressurizing equipment with a pressure relief valve and a pressurizing valve to uniformly and continuously apply pressure to the dummy furnace tube 2 via the connecting tube 20 and adjust the pressure of the dummy furnace tube 2 to the required pressure value. For example, in the process of applying pressure, deionized water is used as the pressurizing medium, the simulated pressure is between 5% and 100% of the actual working pressure, and the relative error of the pressure value is less than 1.0%.

Furthermore, in the simulation process, if the steam pressure is lower than the estimated pressure value by 1.0%, the steam pressure should be pressurized immediately and maintained at a constant pressure, and the time for the steam pressure dropping by 1.0% is less than one minute.

On the other hand, in the heating process, a thermocouple used for temperature control of the heater is of R-Type, and the thermocouple used for temperature measurement of the dummy furnace tube 2 is of K-Type. For example, an accuracy of the temperature controller is 0.1° C., and an accuracy of the temperature compensation is within ±1° C.

Also, the high-temperature furnace used for heating is provided with three independent temperature control sections (i.e., upper, middle, and lower sections), and a length of the temperature equalization zone is greater than 1.2 times the length of the dummy furnace tube 2. For example, the heating element of the high-temperature furnace should be equipped with at least one isolation device, which cannot be exposed to the atmosphere, and the temperature deviation of the upper, middle and lower sections of the high-temperature furnace should be less than ±3° C.

Figure 3:
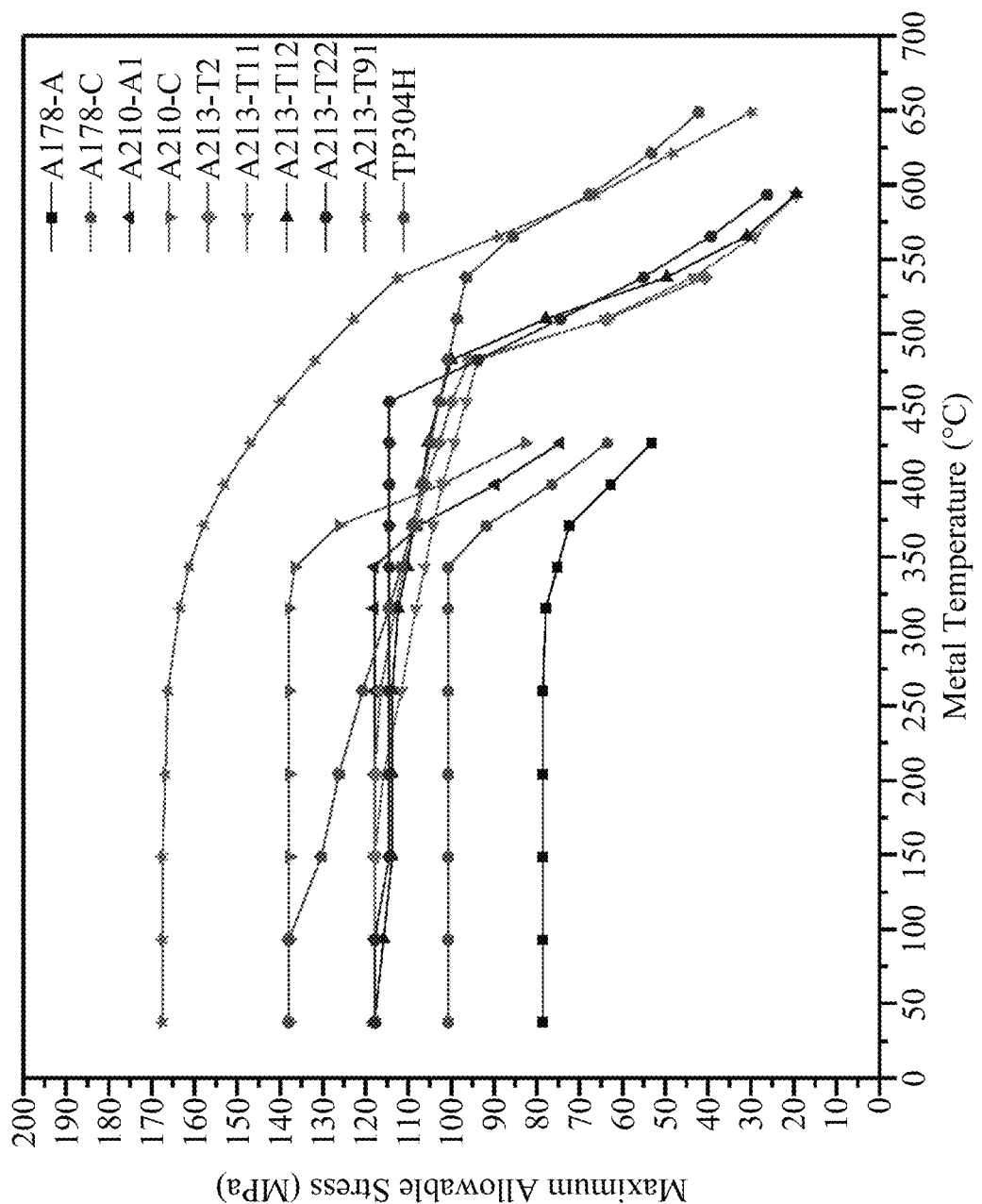
FIG. 3 is an excerpted diagram in reference to page 115 of ASME B31.1-2007 used in the simulated operation of FIG. 1.

In the simulation process, in addition to the factors of the outer diameter and wall thickness of the furnace tube body 2a, the material of the furnace tube body 2a will also affect the deformation amount of the furnace tube body 2a, as shown in FIG. 3 (excerpted from "Maximum Allowable Stress Values in Tension, MPa, for Metal Temperature, ° C., Not Exceeding" on page 115 of ASME B31.1-2007). For example, if metal materials such as carbon steel, low alloy steel, or stainless steel are used, the maximum allowable stress performance at high temperature is different, and the amount of chromium content will determine whether the occurrence of the steep drop in temperature value under the maximum allowable stress is delayed. Therefore, the performance of the allowable stress of the metal materials at high temperature will determine the deformation amount of the furnace tube body 2a when the furnace tube body 2a operates under high temperature and high pressure.

Figure 4A:
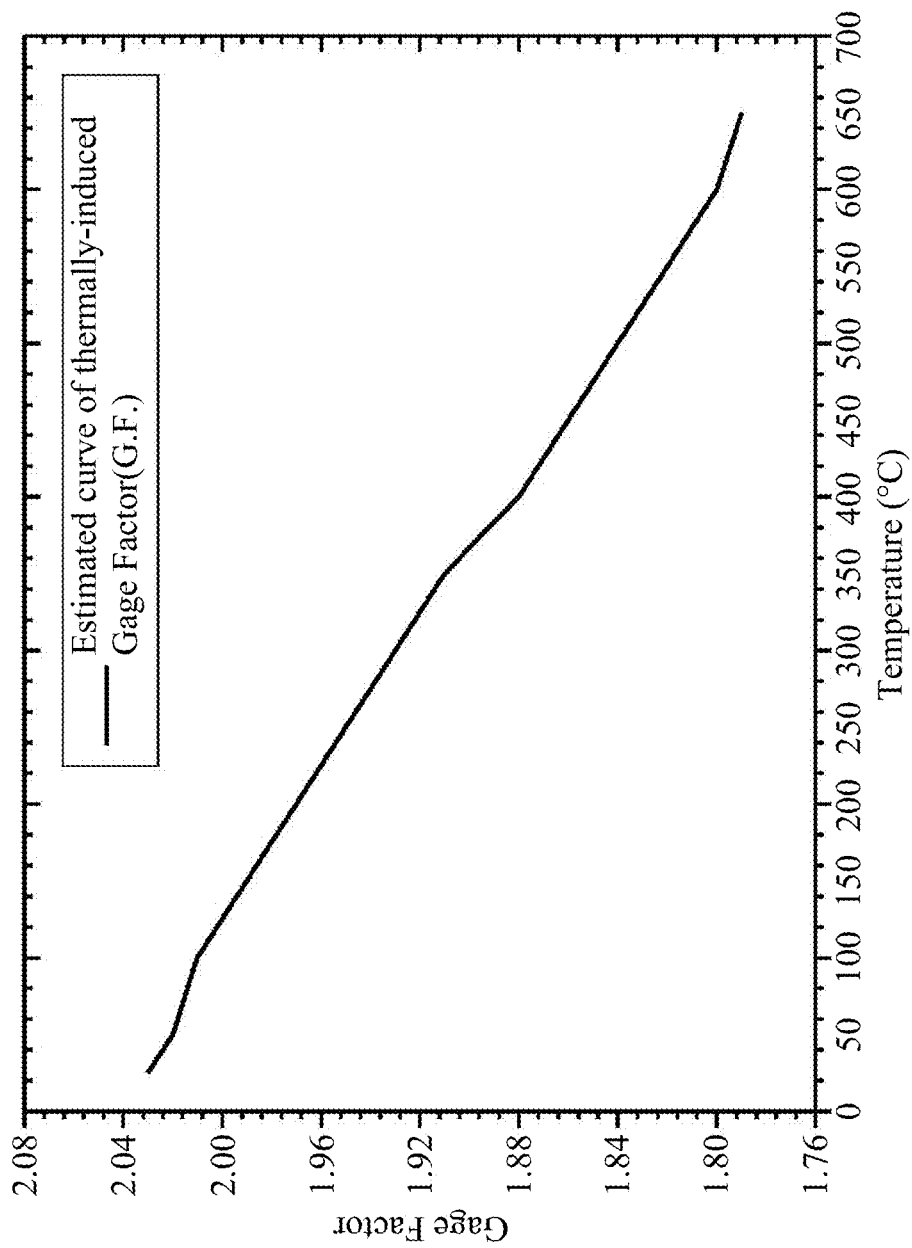
FIG. 4A is a curve diagram showing a relationship between a gage factor and a temperature used in the simulated operation of FIG. 1.
Figure 4B:
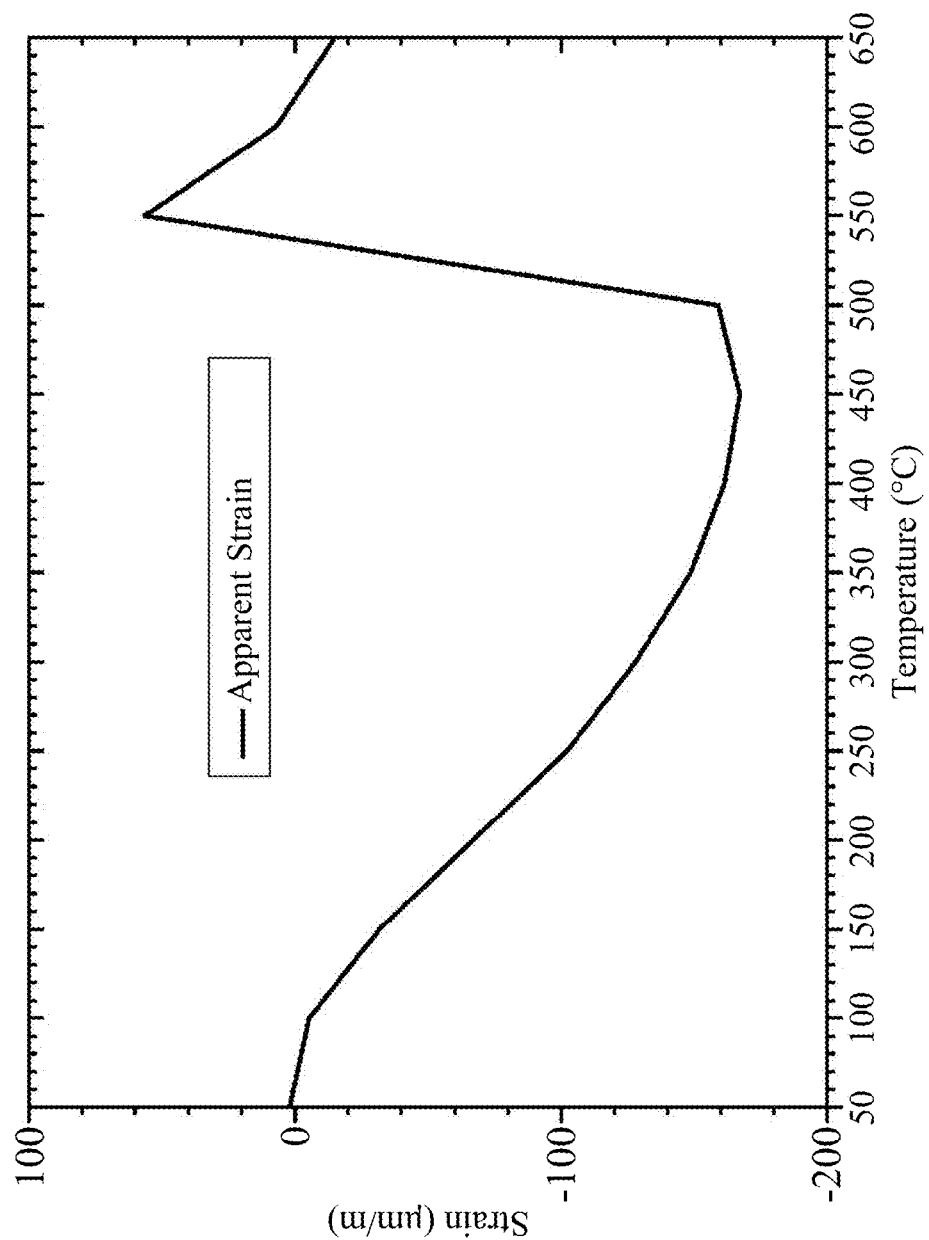
FIG. 4B is a curve diagram showing a relationship between a temperature and an apparent strain used in the simulated operation of FIG. 1.

In the simulation process, the strain gauge is installed on a surface of the furnace tube body 2a and is in circuit/electrical balance with the electronic instrument (which captures the data of the strain gauge), so the measured strain value is an indicated strain, and the temperature change will cause the change of the resistance, such that the gage factor of the strain gauge will increase or decrease with the temperature change, as shown in FIG. 4A. The strain value measured simply by the temperature-induced resistance change is called as apparent strain, as shown in FIG. 4B. Therefore, the strain gauge is combined with the material of the furnace tube body 2a, and the thermal expansion effect of the strain gauge and the material of the furnace tube body 2a will generate an apparent mechanical strain. Hence, in order to obtain an accurate strain, the gage factor and the apparent strain can be implemented with strain of compensated.

After the simulation, the simulation data is integrated into a target curve diagram shown in FIG. 1. In FIG. 1, the strain increases regularly with the increase of steam pressure under the condition of a constant temperature. If the heating is continued, the furnace tube body 2a will produce the same curve trend of the strain under the condition of different steam pressures. Further, when the temperature is above 500° C., the strain will start to increase significantly, which is due to the precipitation of ferrite at the grain boundaries. Therefore, there is a reasonable change in the strain amount under normal operating condition, such that when the actual furnace tube operates under various conditions such as abnormal steam pressure, long-term overheating or short-term overheating, the strain will immediately rise sharply, and an occurrence time of the tube breakage accident can also be predicted from an increase of the creep rate.

Figure 5:
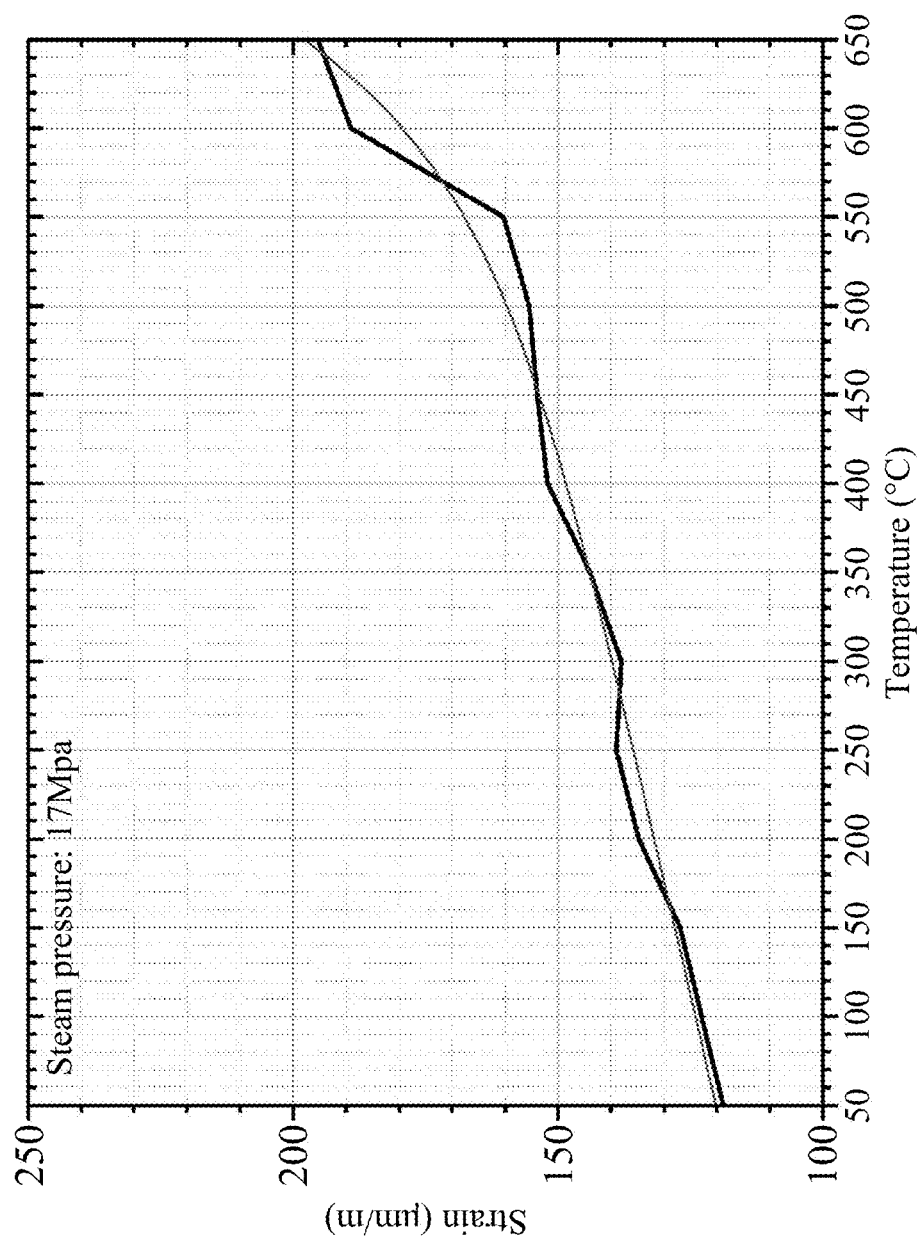
FIG. 5 is a curve diagram of the fitted FIG. 1.

Based on the target curve diagram shown in FIG. 1, a target formula (Tzeng's Equation) can be obtained by curve fitting and is shown below:

$$\varepsilon = A \times e^{-T/B} + C \times e^{-T/D} + E$$

wherein, taking the steam pressure of 17 MPa as an example, as shown in FIG. 5, ε is the strain of the furnace tube material, T is the temperature in Celsius at which the boiler is operating, A, B, C, D and E are the indicated values (or coefficients), and e is the Euler's number. It should be understood that the deformation of the metal material caused by different steam pressures with the operating temperature T can be presented in an exponential mathematical form.

In view of the above, in the method for measuring steam pressure of the present disclosure, the maintenance personnel (or other users) can obtain/know the steam pressure value inside the target object by looking up a furnace tube steam pressure graph plotted according to the temperature and the strain to easily and effectively determine whether a steam leakage caused by abnormality (such as expansion or broken tube) occurs in the target object.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore, the scope claimed of the present disclosure should be defined by the following claims.

What is claimed is:

1. A method for determining steam leakage, comprising:
obtaining a dummy furnace tube by mechanically cutting a sample of an entire furnace tube;
simulating an operation of an actual furnace tube by pressurizing an inside of the dummy furnace tube to a plurality of different steam pressures and heating an outer wall of the dummy furnace tube to a plurality of different operating temperatures, wherein a water pressure test with a water pressure higher than a said steam pressure is performed on the dummy furnace tube before the inside of the dummy furnace tube is pressurized to the steam pressure;
installing at least one thermocouple and at least one strain gauge in an upper section, a middle section and a lower section of the dummy furnace tube to record strain values of the dummy furnace tube corresponding to the steam pressures and the operating temperatures;
providing a steam pressure graph plotted according to the steam pressures, the operating temperatures and the strain values; and
determining whether a steam leakage occurs in the actual furnace tube according to the strain values by looking up the steam pressure graph.

2. The method of claim 1, wherein the steam pressure graph is curvilinearly integrated into a target curve diagram comprising a plurality of curves, and each of the curves represents a relation between the operating temperatures and a subset of the strain values under one of the steam pressures.

3. The method of claim 1, wherein the dummy furnace tube comprises a furnace tube body, a first cylindrical cover and a second cylindrical cover covering both ends of the furnace tube body, a connecting tube penetrating through the first cylindrical cover to protrude at the end of the furnace tube body, and an inner body located in the furnace tube body.

4. The method of claim 3, wherein the first cylindrical cover and the second cylindrical cover are metal structures.

5. The method of claim 3, wherein the inner body is a metal tube body and is separated from an inner wall of the furnace tube body with a distance.

6. The method of claim 3, wherein the connecting tube is a stainless-steel high-pressure tube.

7. The method of claim 1, wherein two ends of the dummy furnace tube are closed in the simulating of the operation of the actual furnace tube.

8. The method of claim 2, wherein a target formula is obtained based on the target curve diagram via curve fitting, and the target formula is an exponential mathematical representation of a deformation of metal materials due to the different steam pressures with the different operating temperatures.

* * * * *